US012657290B2

(12) United States Patent　　(10) Patent No.:　US 12,657,290 B2
　　Givental et al.　　　　　　　　(45) Date of Patent:　　Jun. 16, 2026

(54) GENETIC PROGRAMMING FOR DYNAMIC CYBERSECURITY

(71) Applicant: International Business Machines Corporation, Armonk, NY (US)

(72) Inventors: Gary I. Givental, Bloomfield Hills, MI (US); Aankur Bhatia, Bethpage, NY (US); Joel Rajakumar, Atlanta, GA (US)

(73) Assignee: INTERNATIONAL BUSINESS MACHINES CORPORATION, Armonk, NY (US)

( * ) Notice:　Subject to any disclaimer, the term of this patent is extended or adjusted under 35 U.S.C. 154(b) by 1175 days.

(21) Appl. No.: 17/454,933

(22) Filed:　Nov. 15, 2021

(65)　　　　Prior Publication Data

US 2023/0153421 A1　　May 18, 2023

(51) Int. Cl.
　　G06F 21/55　　　(2013.01)
　　G06N 3/126　　　(2023.01)
　　G06N 20/00　　　(2019.01)
(52) U.S. Cl.
　　CPC .............. G06F 21/55 (2013.01); G06N 3/126 (2013.01); G06N 20/00 (2019.01); G06F 2221/034 (2013.01)
(58) Field of Classification Search
　　CPC .... G06F 21/55; G06F 2221/034; G06N 20/00
　　See application file for complete search history.

(56)　　　　　References Cited

U.S. PATENT DOCUMENTS

| | | | |
|---|---|---|---|
| 6,446,055 B1 * | 9/2002 | Grand ..................... | G06F 9/465 706/47 |
| 9,043,894 B1 * | 5/2015 | Dennison ............ | H04L 63/1408 726/11 |
| 9,690,938 B1 | 6/2017 | Saxe et al. | |
| 10,284,585 B1 | 5/2019 | Kennedy et al. | |
| 10,503,899 B2 * | 12/2019 | Moore ................ | H04L 63/1416 |
| 12,346,801 B2 * | 7/2025 | Conwell .................. | G06N 3/08 |
| 2003/0051026 A1 * | 3/2003 | Carter ................. | H04L 63/0263 709/224 |

(Continued)

OTHER PUBLICATIONS

Srinivas et alv("Adapative Probailities of Crossover and Mutation in Genectic Algroithms", IEEE, vol. 24, No. 4, 1994, pp. 656-667 ).*

(Continued)

*Primary Examiner* — Jennifer N Welch
(74) *Attorney, Agent, or Firm* — Anthony Mauricio Pallone, Esq.; Matthew M. Hulihan, Esq.; Heslin Rothenberg Farley & Mesiti P.C.

(57)　　　　　ABSTRACT

Techniques for improved cybersecurity are provided. A plurality of feature subsets are identified, each containing a respective subset of features from a plurality of features included in a set of training security logs. The plurality of feature subsets is modified using one or more genetic programming techniques, and each of the plurality of feature subsets is scored using a plurality of threat classifiers, where the plurality of threat classifiers comprise trained machine learning models. A set of feature subsets is selected, from the plurality of feature subsets, based on the scores. A type classifier is trained based on the set of feature subsets, where the type classifier comprises a trained machine learning model.

14 Claims, 7 Drawing Sheets

(56) References Cited

U.S. PATENT DOCUMENTS

| | | | | |
|---|---|---|---|---|
| 2013/0198119 A1* | 8/2013 | Eberhardt, III | ........ | G06N 20/00 |
| | | | | 706/12 |
| 2014/0344018 A1* | 11/2014 | Thalken | ................. | G06Q 40/03 |
| | | | | 705/7.31 |
| 2016/0119365 A1* | 4/2016 | Barel | ...................... | G06F 16/95 |
| | | | | 726/12 |
| 2016/0156655 A1* | 6/2016 | Lotem | ................. | H04L 63/1416 |
| | | | | 726/23 |
| 2016/0170996 A1* | 6/2016 | Frank | .................... | G06F 16/904 |
| | | | | 707/748 |
| 2016/0170998 A1* | 6/2016 | Frank | .................... | G06F 16/908 |
| | | | | 707/748 |
| 2016/0224803 A1* | 8/2016 | Frank | ................. | G06F 21/6245 |
| 2017/0187734 A1* | 6/2017 | Lee | ...................... | H04L 63/1425 |
| 2017/0251985 A1* | 9/2017 | Howard | ............... | A61B 5/0077 |
| 2018/0013776 A1* | 1/2018 | Gay | ........................ | G06N 20/00 |
| 2018/0041533 A1* | 2/2018 | Chesla | .............. | G06F 16/24578 |
| 2018/0262525 A1* | 9/2018 | Yan | .......................... | G06N 20/00 |
| 2019/0005390 A1* | 1/2019 | Stitt | ......................... | G06N 7/01 |
| 2019/0012456 A1* | 1/2019 | Moore | ................... | G06N 20/00 |
| 2019/0020686 A1* | 1/2019 | Cohen | ..................... | H04L 63/14 |
| 2020/0117523 A1 | 4/2020 | Morrison et al. | | |
| 2020/0302052 A1* | 9/2020 | El-Moussa | .......... | H04L 63/1425 |
| 2020/0382536 A1* | 12/2020 | Dherange | ........... | H04L 63/1425 |
| 2022/0147815 A1* | 5/2022 | Conwell | ............. | H04L 63/1425 |
| 2023/0153421 A1* | 5/2023 | Givental | ................. | G06N 5/01 |
| | | | | 726/23 |
| 2023/0185923 A1* | 6/2023 | Givental | ................. | G06N 3/08 |
| | | | | 706/12 |

OTHER PUBLICATIONS

Suh-Lee et al, ("Text Mining for Security Threat Detection, Discovering Hidden Information in Unstructured Log Messages", IEEE, 2016, pp. 1-9).*

Fontaine et al. "Log-Based Intrusion Detection for Cloud Web Applications Using Machine Learning." International Conference on P2P, Parallel, Grid, Cloud and Internet Computing. Springer, Cham, 2019.

Feizollah et al. "A study of machine learning classifiers for anomaly-based mobile botnet detection." Malaysian Journal of Computer Science 26.4 (2013): 251-265.

Su et al., "Smartphone dual defense protection framework: Detecting malicious applications in android markets." 2012 8th International Conference on Mobile Ad-hoc and Sensor Networks (MSN). IEEE, 2012.

Chaba et al. "Malware detection approach for android systems using system call logs." arXiv preprint arXiv:1709.08805 (2017).

Chen et al., "Adversarial machine learning in malware detection: Arms race between evasion attack and defense." 2017 European Intelligence and Security Informatics Conference (EISIC). IEEE, 2017.

Kolcz et al., "Feature weighting for improved classifier robustness." CEAS'09: sixth conference on email and anti-spam. 2009.

L. Shao, L. Liu and X. Li, "Feature Learning for Image Classification Via Multiobjective Genetic Programming," in IEEE Transactions on Neural Networks and Learning Systems, vol. 25, No. 7, pp. 1359-1371, Jul. 2014, doi: 10.1109/TNNLS.2013.2293418.

Ling Guo, Daniel Rivero, Julián Dorado, Cristian R. Munteanu, Alejandro Pazos, Automatic feature extraction using genetic programming: An application to epileptic EEG classification, Expert Systems with Applications, vol. 38, Issue 8, 2011, pp. 10425-10436, ISSN 0957-4174, https://doi.org/10.1016/j.eswa.2011.02.118. (https://www.sciencedirect.com/science/article/pli/S0957417411003253) [Abstract Only].

* cited by examiner

600

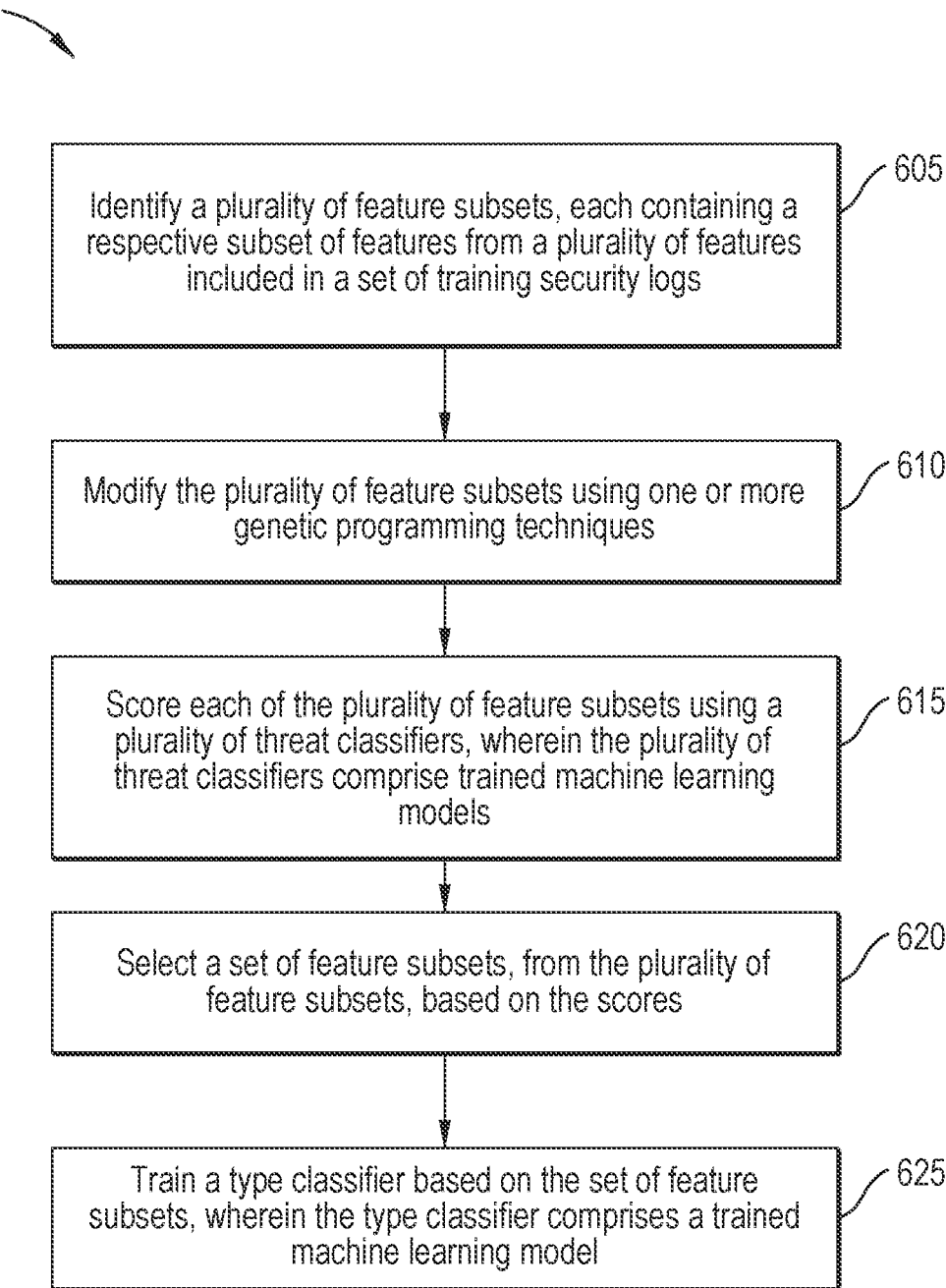

605

Identify a plurality of feature subsets, each containing a respective subset of features from a plurality of features included in a set of training security logs

610

Modify the plurality of feature subsets using one or more genetic programming techniques

615

Score each of the plurality of feature subsets using a plurality of threat classifiers, wherein the plurality of threat classifiers comprise trained machine learning models

620

Select a set of feature subsets, from the plurality of feature subsets, based on the scores

625

Train a type classifier based on the set of feature subsets, wherein the type classifier comprises a trained machine learning model

FIG. 6

GENETIC PROGRAMMING FOR DYNAMIC CYBERSECURITY

BACKGROUND

The present disclosure relates to cybersecurity, and more specifically, to using genetic programming and machine learning to improve cybersecurity.

In conventional security systems, when a security analyst performs threat disposition, she often encounters vastly different types of problems (e.g., different types of attacks targeting different data using different methods). Often, each of these security concerns involves a different subset of the feature space (e.g., the space of all possible features of potential threats). That is, each different concern typically has differing elements that are relevant in detecting and preventing the attack (e.g., different signatures, different origins, and the like). Many conventional systems rely greatly on manual effort to identify these threats.

Some systems have introduced machine learning models to perform automated threat disposition. However, these conventional approaches use a static set of features, and they score these features based on their effect on an entire dataset. However, though such techniques can work for some specific threats, they often fail to perform adequately across the broad spectrum of threats that are possible. For example, there are often different feature weightings which perform accurately only on some types of threats in the dataset. In conventional systems, these specific subsets cannot be identified and evaluated, and therefore the model typically performs poorly in identifying such threats.

SUMMARY

According to one embodiment of the present disclosure, a method is provided. The method includes identifying a plurality of feature subsets, each containing a respective subset of features from a plurality of features included in a set of training security logs; modifying the plurality of feature subsets using one or more genetic programming techniques; scoring each of the plurality of feature subsets using a plurality of threat classifiers, wherein the plurality of threat classifiers comprise trained machine learning models; and selecting a set of feature subsets, from the plurality of feature subsets, based on the scores; and training a type classifier based on the set of feature subsets, wherein the type classifier comprises a trained machine learning model.

According to one embodiment of the present disclosure, a system is provided. The system includes one or more computer processors, and logic encoded in a storage medium, the logic executable by operation of the one or more computer processors to perform an operation. The operation comprises identifying a plurality of feature subsets, each containing a respective subset of features from a plurality of features included in a set of training security logs; modifying the plurality of feature subsets using one or more genetic programming techniques; scoring each of the plurality of feature subsets using a plurality of threat classifiers, wherein the plurality of threat classifiers comprise trained machine learning models; and selecting a set of feature subsets, from the plurality of feature subsets, based on the scores; and training a type classifier based on the set of feature subsets, wherein the type classifier comprises a trained machine learning model.

According to one embodiment of the present disclosure, a computer product is provided. The computer product includes logic encoded in a non-transitory medium, the logic executable by operation of one or more computer processors to perform an operation. The operation comprises identifying a plurality of feature subsets, each containing a respective subset of features from a plurality of features included in a set of training security logs; modifying the plurality of feature subsets using one or more genetic programming techniques; scoring each of the plurality of feature subsets using a plurality of threat classifiers, wherein the plurality of threat classifiers comprise trained machine learning models; and selecting a set of feature subsets, from the plurality of feature subsets, based on the scores; and training a type classifier based on the set of feature subsets, wherein the type classifier comprises a trained machine learning model.

BRIEF DESCRIPTION OF THE SEVERAL VIEWS OF THE DRAWINGS

FIG. 6 is a flow diagram illustrating a method for genetic programming and machine learning to improve threat detection.

DETAILED DESCRIPTION

In embodiments of the present disclosure, techniques are provided to evaluate feature subsets using genetic programming and machine learning. In embodiments, the feature subsets and machine learning models can then be dynamically applied to incoming threats based on which local region of the feature space to which the threat belongs.

In an embodiment, genetic programming is used to produce several feature subsets that are each accurate on specific local regions of the data. In some embodiments, the system seeks to select feature subsets to improve the accuracy of the resulting classifications, as well as increase the size of the local regions. Once these feature subsets are defined, they can be used to train a dynamic model selection pipeline, such that a different model (trained on the best feature subset for that region) can be applied in real-time to each threat based on the region to which the threat belongs. That is, during runtime, the system can first process the potential threat using an initial type classifier that identifies which feature(s) should be used to classify the potential threat. The potential threat can then be evaluated using a classifier model trained specifically for this subset of features, enabling more accurate and robust automated threat detection.

Figure 1:
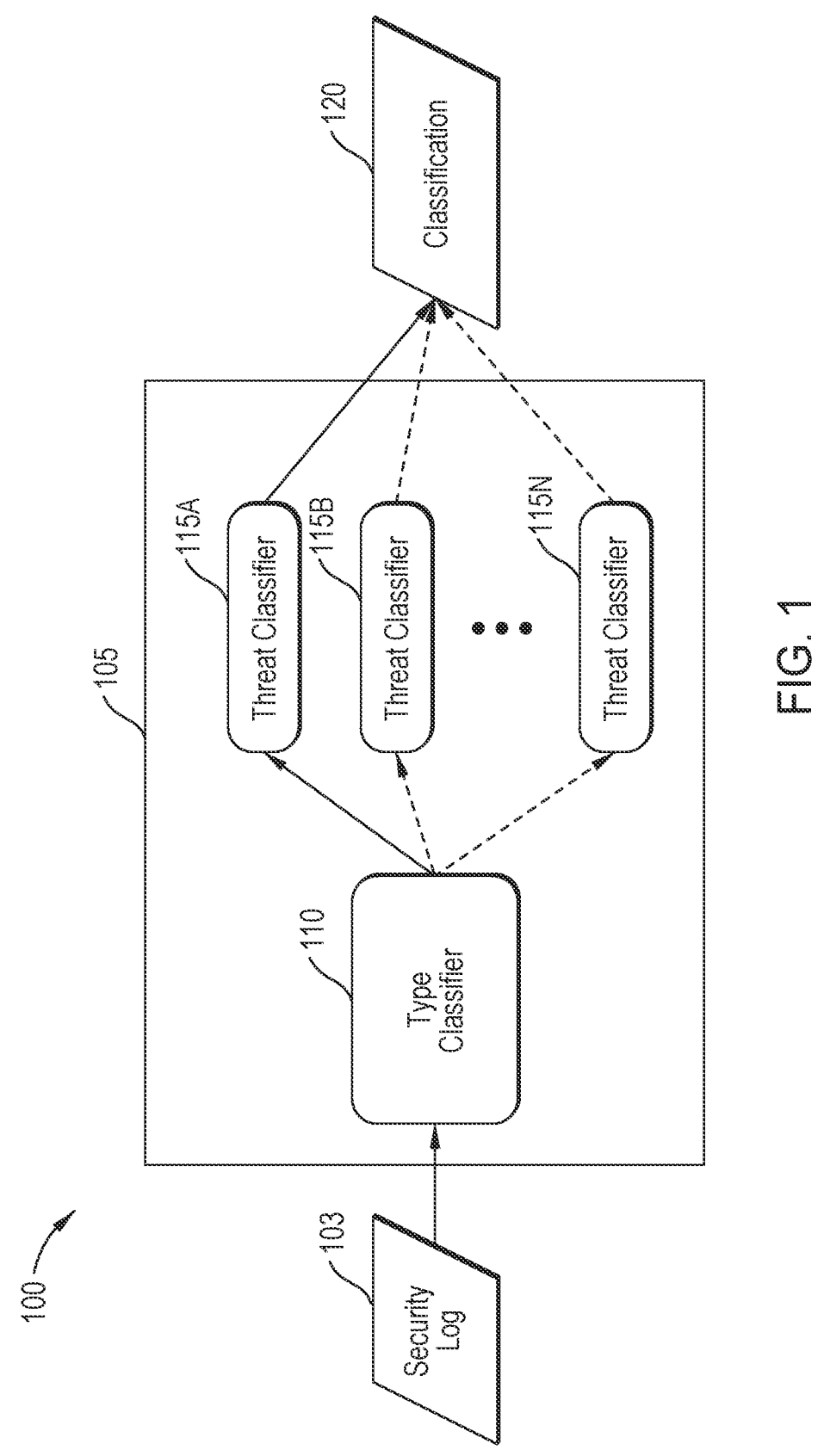
FIG. 1 depicts an example workflow for cybersecurity threat classification using machine learning.

FIG. 1 depicts an example workflow 100 for cybersecurity threat classification using machine learning.

In the illustrated workflow 100, a security log 103 is received by a security system 105. In embodiments, the security system 105 can be implemented in a variety of ways, including as one or more hardware components, one or more software components executing on one or more devices, as a system operating in the cloud, and the like. Generally, the security system 105 is an automated threat detection and classification system that receives security logs 103 and generates an output classification 120 indicating whether the security log 103 is a true threat (e.g., a cybersecurity attack) or not (e.g., a false alarm). In some embodiments, the security logs 103 are generated by a separate system. For example, another system may perform an initial threat detection, and forward some or all of the potential threats to the security system 105, which makes the final classification 120.

In the illustrated example, the security system 105 uses an initial type classifier 110, which is a machine learning model that is trained to evaluate the input security log 103 in order to identify the type of the potential threat (e.g., the region of the feature space to which the threat belongs). In one aspect, to do so, the security system 105 can evaluate all of the features of the security log 103. The particular features used for this initial classification may vary depending on the particular implementation, and can include features or attributes such as the IP address(es) associated with the log, event name(s) relevant to the log, malware hash(es) included in the log, the geographical origin of the data (e.g., the location of the entity that initiated the potential threat), an initial or potential categorization of the threat, and the like.

As illustrated, based on these features, the security system 105 can classify the security log 103 into a category or region of the feature space indicating the likely type of the threat and, therefore, the proper subset of features that should be used to evaluate it (and which model should perform this evaluation). For example, in the illustrated embodiment, the type classifier 110 determines that the security log 103 should be processed using the threat classifier 115A.

In the illustrated example, there are three threat classifiers 115A, 115B, and 115N. In embodiments, however, there may of course be any number of threat classifiers 115. Generally, the threat classifiers 115 are machine learning models that have been trained on some subset of the feature space in order to classify input security logs 103 based on whether they represent a true threat. That is, each threat classifier 115 may be trained to use a subset of the features in the feature space, enabling each to specialize for its respective region and type of threat. For example, suppose the feature space includes one hundred different features. In some embodiments, the type classifier 110 may evaluate all one hundred features to perform the type classification, and each threat classifier 115 can use some subset (e.g., the threat classifier 115A may use twenty of them, the threat classifier 115B may use forty-two, and the threat classifier 115N may use seventeen).

In some embodiments, each threat classifier 115 uses the same number of features. That is, each threat classifier 115 may use a subset of N features, where N is specified by an administrator. Notably, however, the particular features within each subset may differ. Further, these subsets may be partially overlapping or entirely disjoint. For example, if all of the threat classifiers 115 use a subset of three features, the threat classifier 115A may use features "A", "B", and "C", while threat classifier 115B uses features "B", "D", and "F", and threat classifier 115N uses features "E", "G", and "Z". In some embodiments, if a given region of the feature space depends on less than the N defined features (e.g., if N is defined as twenty, but only fifteen features are needed to classify threats in the region), the corresponding threat classifier 115 will learn, during training, to essentially ignore the remaining five features and they will have little or no effect on the classifications.

In an embodiment, the particular features used by each threat classifier 115 are learned with the aid of genetic programming, as discussed in more detail below. In some embodiments, by iteratively generating and scoring feature subsets, the security system 105 can identify feature subsets that are highly predictive for their local regions, while simultaneously ensuring that each region is as large as possible. That is, the security system 105 seeks to identify feature subsets that not only categorize threats accurately, but that also handle as many different types of threat as possible. This can allow the security system 105 to reduce the number of threat classifiers 115 that are used to cover the feature space, while still ensuring high accuracy of the system.

As illustrated, the selected threat classifier 115 outputs the classification 120. In some embodiments, in addition to indicating whether the security log 103 represents a true threat, the classification 120 can also include a confidence. Additionally, though binary classification is used in some examples discussed herein for conceptual clarity, in aspects, the classification 120 may include any number of categories (e.g., a false alarm class, a mild threat class, a moderate threat class, and a severe threat class). Further in some aspects, rather than a discrete classification, the classification 120 indicates a score of the threat indicating its severity (e.g., output using a regression model rather than classifier).

In various embodiments, the classification 120 can be used in a variety of ways. For example, in some embodiments, if the classification indicates that the security log 103 is a true threat, an administrator or other user can be alerted. In some embodiments, automatic measures can be triggered, such as quarantining the corresponding threat, running a scan of the relevant system(s), updating the logs to indicate the threat (and its origin), and the like.

Figure 2:
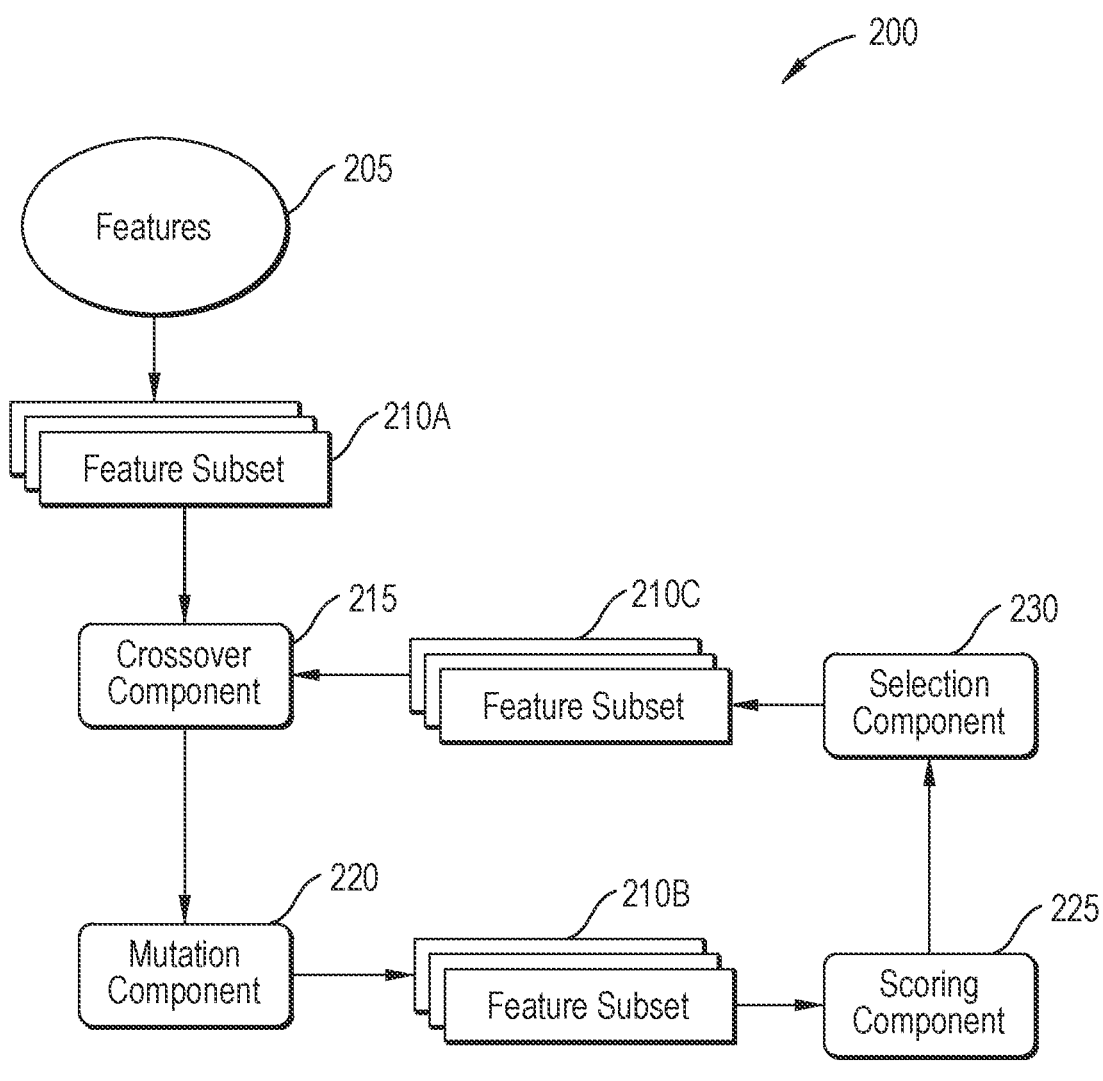
FIG. 2 depicts an example workflow for feature selection using genetic programming to improve cybersecurity threat detection.

FIG. 2 depicts an example workflow 200 for feature selection using genetic programming to improve cybersecurity threat detection. In some embodiments, the workflow 200 is performed by a security system, such as security system 105 of FIG. 1.

As illustrated, a set of features 205 are used to define a set of feature subsets 210A, each of which include some subset of the features 205. Generally, the features 205 include various aspects, attributes, or characteristics of potential security threats, such as the geographic origin, malware hash, the target(s) of the potential attack, the type of the attack, and the like. In some embodiments, the features 205 are defined manually (e.g., by an administrator). In some embodiments, all or some of the features 205 are learned or identified automatically.

In the illustrated workflow 200, this initial set of feature subsets 210A may be defined according to a variety of criteria. In at least one embodiment, the security system can generate these feature subsets 210A randomly or pseudo-randomly. In one embodiment, the security system may, for each of the feature subsets 210A, randomly select N features from the set of features 205. In some embodiments, the number of feature subsets 210A, as well as the size of each, is defined by an administrator. For example, the security system may initialize fifty feature subsets 210A, each with twenty features 205. In some embodiments, the security system ensure that the same feature 205 is not selected twice for a given feature subset 210A. That is, the security system can ensure that each feature subset 210A has exactly N features, with no duplicates.

As illustrated, the security system then uses genetic programming techniques using a crossover component 215 and a mutation component 220. Generally, the crossover component 215 and mutation component 220 each modify the set of feature subsets 210A with at least some element of randomness. In the illustrated workflow 200, the crossover component 215 is used to mate feature subsets 210A, which generally involves swapping one or more features from one feature subset 210A with one or more features in a second feature subset 210A.

In at least one embodiment, the crossover component 215 may randomly select two feature subsets 210A, then select one or more features in each (randomly, or using a pre-defined configuration, such as selecting the last m features in each subset), and generate two new feature subsets with these selected features swapped. For example, suppose the first feature subset 210A has features "A," "B," "C," and "D" and the second feature subset 210A has features "E," "F," "G," and "H." Suppose further that the crossover component 215 is configured to swap the last two features to generate the new feature subsets. In one embodiment, the crossover component 215 can thereby generate a first new feature subset with features "A," "B," G," and "H," and a second new feature subset with features "E," "F," C," and "D." In some embodiments, these new feature subsets replace the original feature subsets (e.g., the number of feature subsets is unchanged). In other embodiments, the security system can increase the size of the set of feature subsets by adding these newly-generated ones.

In at least one embodiment, the security system can ensure that this mating does not cause the newly-generated feature subsets to include duplicate features. In some embodiments, the crossover component 215 operates once per cycle, generating two new feature subsets. In other embodiments, the crossover component 215 may select more than two feature subsets 210A (e.g., mating two or more different pairs of subsets). In the illustrated embodiment, the security system can then use a mutation component 220 to further transform the set of feature subsets 210A.

In the workflow 200, the mutation component 220 is used to mutate the feature subsets 210A. In at least one embodiment, the mutation component 220 selects one or more of the feature subsets 210A randomly, and then randomly selects one or more of the features within each selected feature subset 210A. The mutation component can then change each selected feature to another randomly-selected feature, thereby introducing a mutation to the set of feature subsets 210A. For example, if the mutation component 220 selects a feature subset including features "A," "B," "C," and "D" and further selects the third feature (e.g., feature "C") for mutation, the security system can then generate a new feature subset including features "A," "B," "Z," and "D", where "Z" is a randomly-selected feature from the set of features 205. In at least one embodiment, the security system ensures that the mutation process does not cause any of the feature subsets to include duplicate features.

In some embodiments, the number of feature subsets to mutate, as well as the number of features within each subset to mutate, is defined by an administrator. In some embodiments, the mutation component 220 generates a new feature subset for each mutated subset. That is, for each feature subset to be mutated, the security system may add a new feature subset to correspond to this mutation (e.g., by copying or duplicating the feature subset, and then mutating the duplicate). In other embodiments, the security system may enact the mutation in place, such that the number of feature subsets does not change.

Though the illustrated workflow 200 depicts a sequential connection between the crossover component 215 and the mutation component 220 (e.g., such that the crossover is performed prior to the mutation) for conceptual clarity, in embodiments, they may be executed in other orders. Further, some embodiments, the security system may use only one of the transformations, rather than both. In at least one embodiment, the security system can randomly determine, for each cycle, whether to use the crossover component 215, the mutation component 220, or both.

As illustrated, these genetic programming transformations result in a set of feature subsets 210B. In some embodiments, as discussed above, this set of feature subsets 210B may include more feature subsets than the original set 210A. In the illustrated workflow 200, this new set of feature subsets 210B is then processed by a scoring component 225. The scoring component 225 generally evaluates and scores each respective feature subset of the set of feature subsets 210B based on how well it works to classify potential threats, such as how accurately it can classify potential threats, how large of a region it classifies accurately (e.g., how many different kinds of threats it work well for), and the like. In at least one embodiment, the scoring component 225 operates by training a respective machine learning model using each feature subset, and evaluating these models. One example workflow of scoring the subsets is discussed below in more detail with reference to FIG. 3.

As illustrated, the scores are then used by the selection component 230 to generate a new set of feature subsets 210C. In some embodiments, the selection component 230 ranks the feature subsets 210B based on their corresponding scores, and selects one or more of these subsets to be retained (or, alternatively, one or more to be removed). For example, suppose the initial set of feature subsets 210A included fifty subsets, and the modified set of feature subsets 210B included fifty-five. In one embodiment, the selection component 230 can select the top fifty (or remove the bottom three) to yield a set of feature subsets 210C of the same size as the original set. As illustrated, these feature subsets 210C are then provided to the crossover component 215 to begin the genetic programming cycle anew.

In some aspects, this cycle can repeat until some defined termination criteria has been satisfied. This may include, for example, a maximum number of cycles, a maximum amount of time or computing resources spent, a minimum preferred accuracy or performance of the resulting models, a determination that the feature space is sufficiently covered by the subsets, and the like. In some embodiments, once the criteria are met, the final set of feature subsets are used to process incoming potential threats, as discussed in more detail below.

Figure 3:
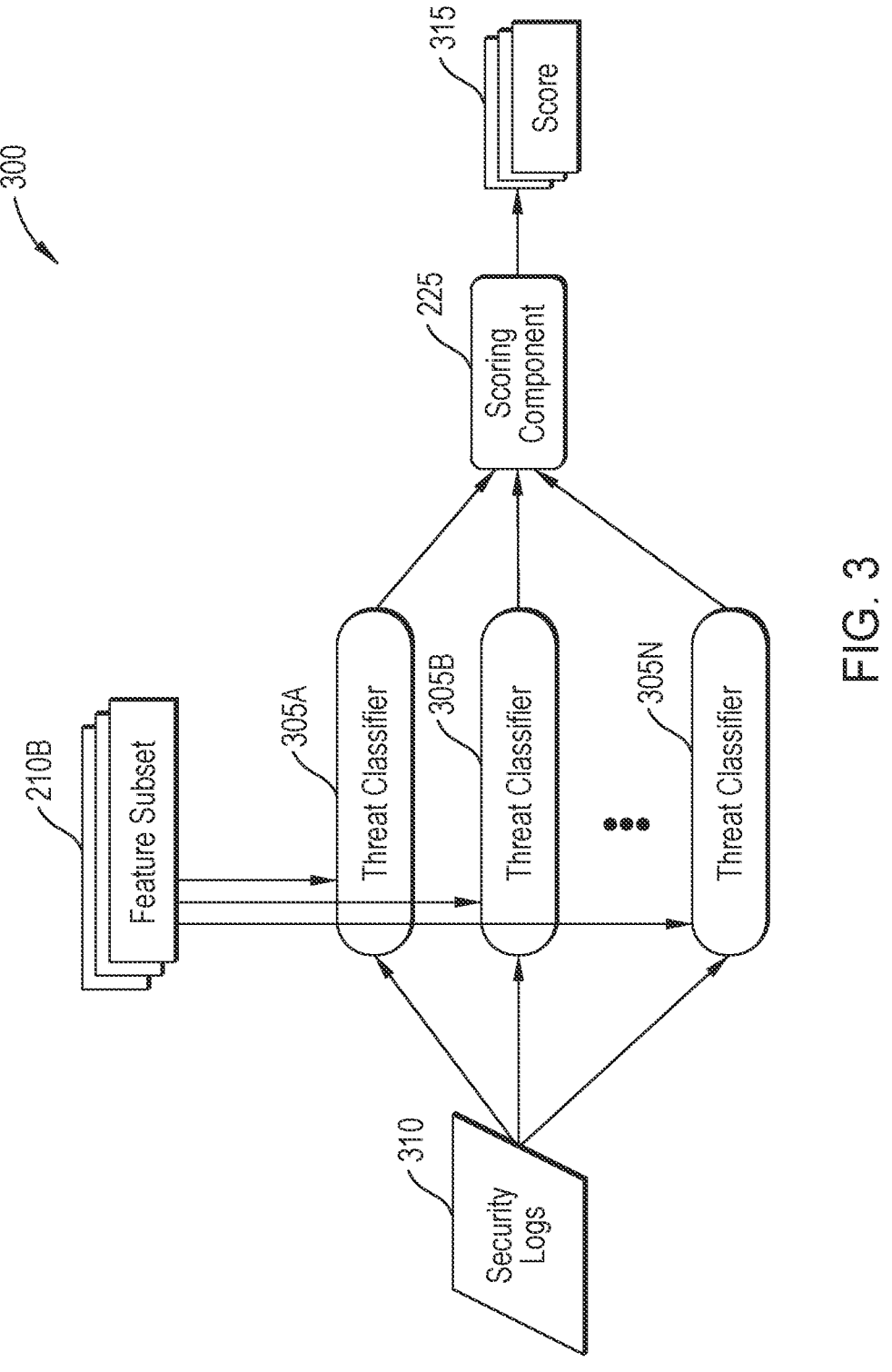
FIG. 3 depicts an example workflow for scoring feature subsets to improve cybersecurity threat detection.

FIG. 3 depicts an example workflow 300 for scoring feature subsets to improve cybersecurity threat detection. In some embodiments, the workflow 300 is performed by a security system, such as security system 105 of FIG. 1.

In the illustrated workflow 300, each subset in the set of feature subsets 210B is used to train a corresponding threat classifier 305. That is, the security system trains each respective threat classifier 305A-N to use features from a corresponding feature subset 210B as input (e.g., using historical training records). For example, if a feature subset 210B includes features "A," "B," and "C," the security system may use training records (each indicating a set of attributes or features of the potential attack, as well as a ground truth classification or value indicating whether it was a true threat) to train a threat classifier 305 that considers only attributes "A," "B," and "C" (potentially excluding one or more other features).

Once the threat classifiers 305 have been thusly trained, a set of security logs 310 are evaluated using the threat classifiers 305 in order to score each classifier and, thereby, to generate a score for each feature subset 210B. In some embodiments, the security logs 310 can generally include similar data to the logs used in training the threat classifiers, but the sets of data may not overlap. For example, of a broader collection of security logs, some subset may be used as a training set, while another subset is used as a testing or evaluation set.

In some embodiments, each security log 310 is processed by each of the threat classifiers 305. The scoring component 225 can then label each security log 310 based on the threat classifier(s) 305 that accurately predicted whether the log corresponded to a true threat. This may include, for example, labeling each with the feature subset(s) 210B that resulted in a correct inference. In at least one embodiment, these labels are used to define the scores 315. For example, the scoring component 225 may rank the feature subsets 210B based on the number (or percentage) of security logs 310 that are accurately predicted by the corresponding classifier 305.

In some embodiments, prior to generating the scores 315, the security system first trains another machine learning model to act as a type classifier (e.g., type classifier 110 of FIG. 1). For example, the security system may use the security logs 310 as input, and use the feature subset(s) 210B that accurately classified the log as target output to refine the type classifier. In this way, the type classifier learns to route input logs to the proper threat classifier 305.

In some embodiments, the scoring component 225 can then process a second testing set of security logs using the type classifier, and subsequently processing each using the assigned threat classifier 305. This can allow the scoring component 225 to determine, for each threat classifier 305, how well it performs for potential threats that are within its local region of the feature space. That is, while the initial round of processing security logs 310 using the trained threat classifiers 305 does not distinguish between types of threats and processes all threats using all models, this second round targets each security log to the proper threat classifier 305, which can result in a more accurate understanding of the accuracy of each threat classifier 305.

In one embodiment, the scoring component 225 can then use these accuracies (determined using the second testing set of logs) to define the scores 315. For example, the scoring component 225 may score the threat classifiers 305 based on its accuracy (e.g., the percentage of input records that were accurately classified). For example, if a first threat classifiers 305A is more accurate, on its corresponding set of security logs 310, than a second threat classifier 305B is on its own corresponding set of security logs 310, the scoring component 225 may score the first threat classifier 305A more highly.

In at least one embodiment, the scores 315 can additionally be determined based on the size local region each threat classifier occupies in the feature space (e.g., the diversity of threats that each can accurately classify). For example, if the type classifier determines that a first threat classifier 310A should be used to process J security logs 310 and that a second threat classifier 310B should be used to process K security logs, where K is less than J, the scoring component 225 may assign the first threat classifier 305A a higher score, because it can (likely) be used to process a larger region of the space (and therefore, a larger number and diversity of potential threats).

As discussed above, these scores 315 are then assigned to the feature subsets 210B. That is, each feature subset 210B is assigned a score based on the performance of the corresponding threat classifier 305 (with respect to accuracy, generalness, and the like). These scores 315 can then be used to eliminate the worst-performing feature subsets 210B. In this way, the security system can iteratively generate better feature subsets that are better fit to classify newly-received security logs.

Figure 4:
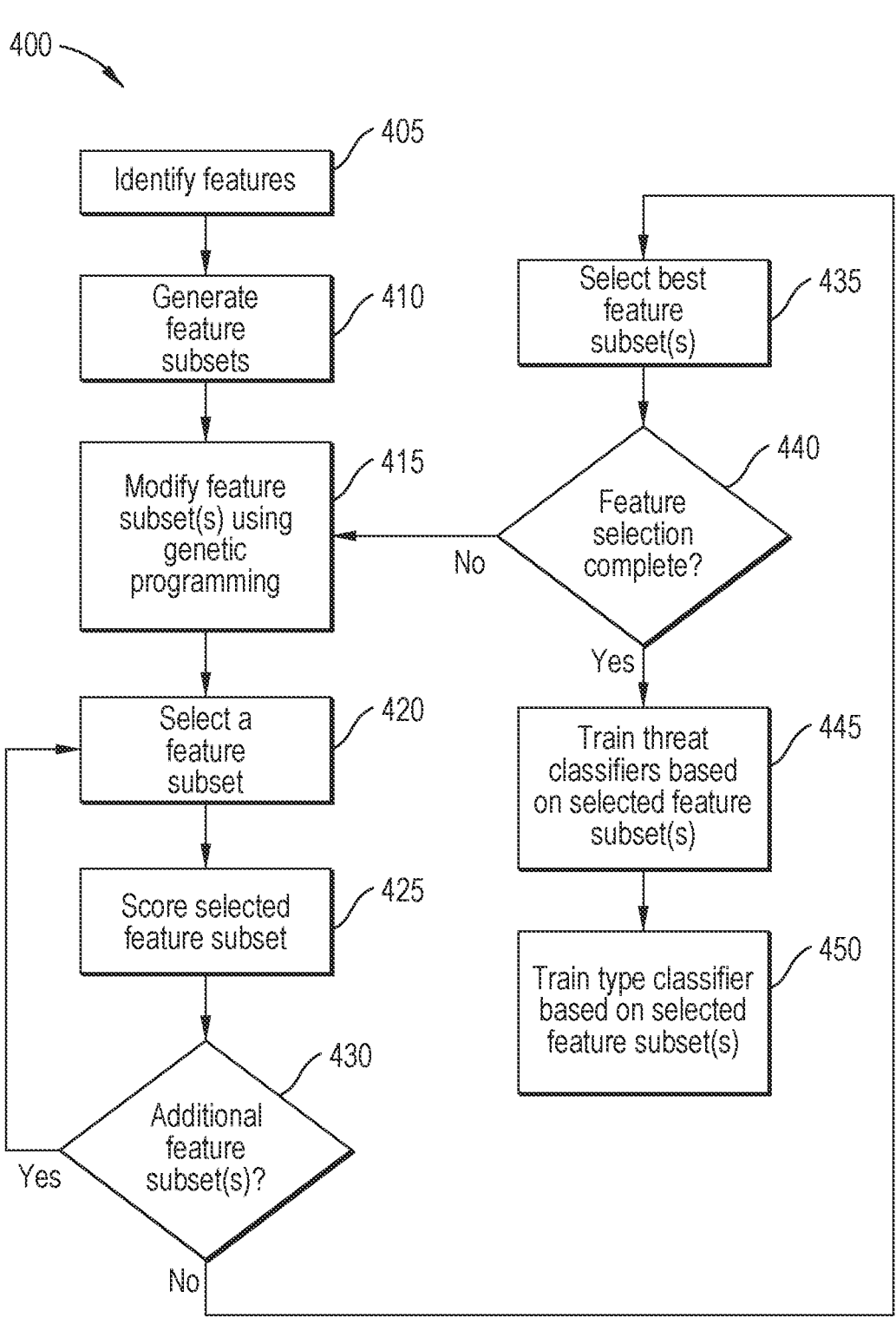
FIG. 4 is a flow diagram illustrating a method for training machine learning models using genetic programming to improve threat detection.

FIG. 4 is a flow diagram illustrating a method 400 for training machine learning models using genetic programming to improve threat detection. In some embodiments, the method 400 is performed by a security system, such as security system 105 of FIG. 1.

At block 405, the security system identifies a set of features that can be used to classify potential security threats. For example, the security system may identify the features 205 of FIG. 2. In some embodiments, these features are manually defined (e.g., by an administrator or other user). In some embodiments, some or all of the features may be automatically learned (e.g., by analyzing prior security threats). As discussed above, in an embodiment, this set of features may generally include some features that are not helpful for classifying some types of threats as real or false, even if they are helpful for classifying some other types of threats. That is, a given feature in the set of features may be useful for one more types of threats, but not useful for one or more other types of threats.

At block 410, the security system generates a set of feature subsets. In some embodiments, this may correspond to the feature subsets 210A of FIG. 2. In at least one embodiment, these initial feature subsets are defined with at least some element of randomness. For example, for each feature subset, the security system may randomly select N features from the pool of features (identified at block 405). In an embodiment, the number of feature subsets and the number of features in each subset may be specified by a user or administrator.

At block 415, the security system modifies the feature subsets using one or more genetic programming techniques. In some embodiments, as discussed above, this may include a crossover operation (also referred to as a mating operation). In some embodiments, the genetic programming techniques can include a mutation operation, as discussed above. Generally, the genetic programming techniques involve modifying one or more of the feature subsets and/or adding one or more new feature subsets with at least some element of randomness. These random changes can allow the security system to find more efficient and optimized feature subsets for particular types of threats.

At block 420, the security system selects one of the feature subsets from the modified set (generated in block 415). In embodiments, this selection can be performed using a wide variety of criteria, as all of the subsets will be similarly operated on. Additionally, although the illustrated example depicts a sequential and iterative process for conceptual clarity (where each feature subset is selected and evaluated in turn), in some embodiments, some or all of the feature subsets may be evaluated in parallel.

At block 425, the security system scores the selected feature subset. In some embodiments, as discussed above, each feature subset is scored based on how well it can be used to accurately classify potential security threats, how diverse the set of threats it accurately classifies is (e.g., how many different types), and the like. One example method for scoring the feature subsets is discussed in more detail below with reference to FIG. 5.

At block 430, the security system determines whether there is at least one additional feature subset that has not yet been scored. If so, the method 400 returns to block 420. If all of the feature subsets in the modified set have been scored, the method 400 continues to block 435.

At block 435, the security system selects one or more of the best feature subsets, based on their associated scores. In some embodiments, the security system identifies the top M feature subsets. In some embodiments, rather than identifying the top M to retain, the security system identifies the bottom L to discard. In an embodiment, the number of feature subsets to retain or discard can be defined by an administrator. In at least one embodiment, the security system discards feature subsets to ensure that the set of feature subsets is the same size as the initial set (generated at block 410).

At block 440, the security system determines whether feature selection is complete. Generally, this can include evaluation of a variety of termination criteria, such as determining whether a defined number of genetic programming and scoring iterations have been completed, determining whether a defined amount of time or computing resources have been used, determining whether the current set of (best) feature subsets are sufficiently accurate, determining whether the feature space is fully covered (e.g., whether all, or a sufficient percentage, of the testing security logs can be accurately classified), and the like.

If the feature selection process is not complete, the method 400 returns to block 415, where the security system applies one or more genetic programming techniques to the current set of feature subsets (selected in block 435). If the security system determines that the feature selection process is complete, the method 400 continues to block 445.

At block 445, the security system trains a set of threat classifiers based on the selected set of feature subset(s). In some embodiments, as discussed above, the threat classifiers are classification models that are trained to receive a specific subset of features from a security log (corresponding to a potential security threat), and output a classification indicating whether the security log is a true threat or a false alarm. In some embodiments, this training is performed using a set of training security logs, each labeled to indicate whether it is a true threat. In some embodiments, these threat classifiers are trained during the scoring operations. In at least one embodiment, therefore, the security system can retain and use these pre-trained classifiers for the feature subsets that were selected, rather than training new ones.

At block 450, the security system trains a type classifier based on the selected feature subsets (assuming multiple subsets were selected). In some embodiments, as discussed above, the type classifier is a classification model trained to receive a set of features (e.g., the features identified in block 405) for input security logs (which correspond to potential threats), and to identify which subset of features (from the set selected in block 435) should be used to classify the potential threat. As discussed above, this training can be performed using the set of training security logs which were annotated, during the scoring process, to indicate which subset of features performed best for each security log. In at least one embodiment, the security system can re-use these annotations and type classifier from the scoring. In some embodiments, the security system can re-annotate the logs (e.g., by performing the scoring operation again) to account for the fact that some of the feature subsets from the last scoring process were discarded.

After the type classifier and threat classifiers are trained, the security system can deploy them for use in analyzing received security logs to classify them appropriately. In some embodiments, these runtime security logs are generated or provided by some other threat detection system. For example, an automated threat detection system may identify potential threats, generate a security log for each, and provide these logs to the security system for classification.

Figure 5:
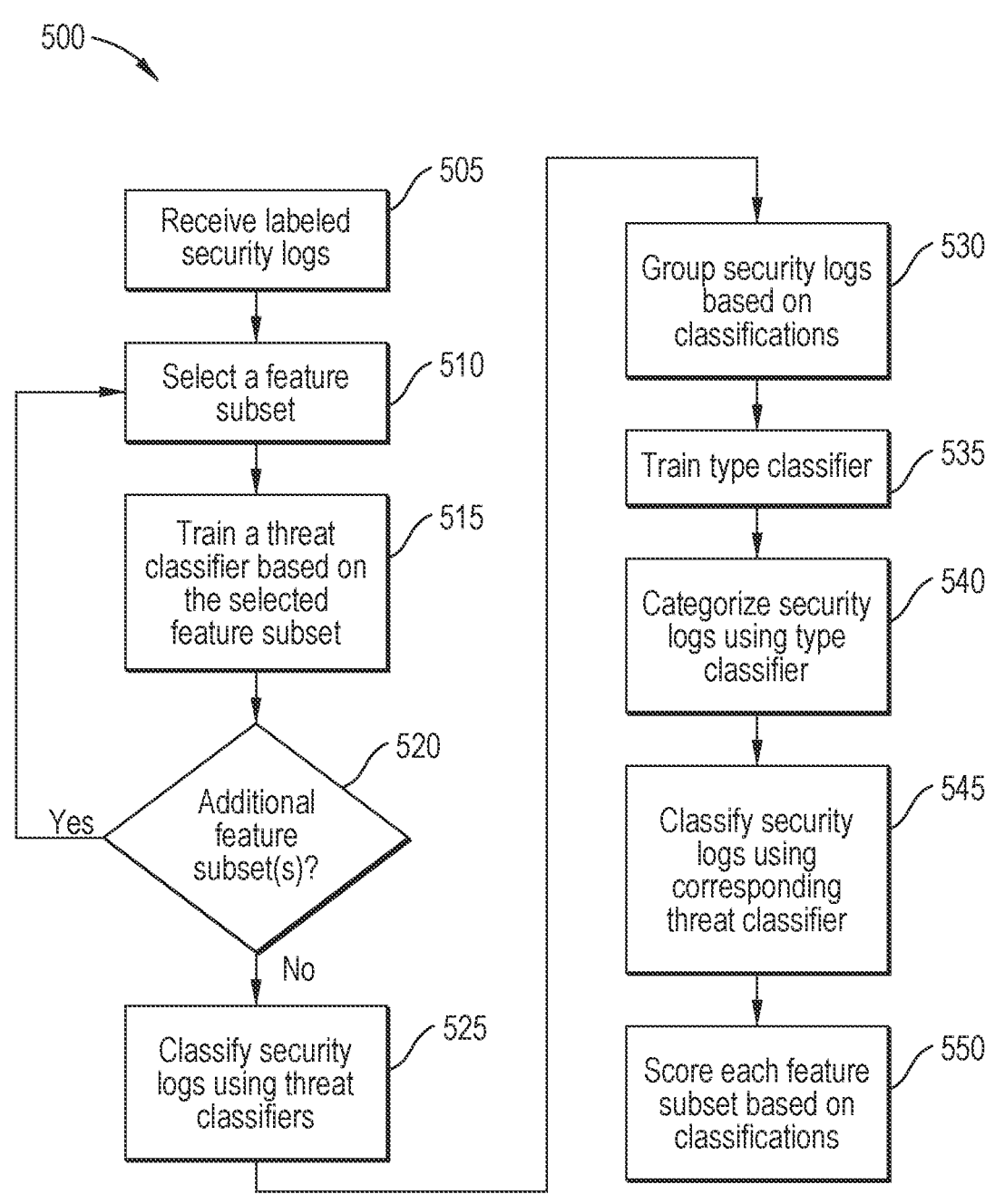
FIG. 5 is a flow diagram illustrating a method for scoring machine learning models and feature subsets to improve threat detection.

FIG. 5 is a flow diagram illustrating a method 500 for scoring machine learning models and feature subsets to improve threat detection. In some embodiments, the method 500 is performed by a security system, such as security system 105 of FIG. 1. In some embodiments, the method 500 provides additional detail for block 425 of FIG. 4.

At block 505, the security system receives a set of labeled security logs. In some embodiments, as discussed above, each of these security logs can generally correspond to a potential security threat that was identified, and the label can indicate whether the potential threat was a true security threat or a false alarm. Each security log is associated with a set of features (such as the geographic origin of the potential threat, event names associated with the potential threat, signatures, IP addresses, and the like) that can be used to classify the threat.

At block 510, the security system selects one of the feature subsets that are being scored. Generally, this selection can be performed using a variety of criteria, as all of the feature subsets will be similarly processed. Additionally, though the illustrated example depicts a sequential iterative process for conceptual clarity, in some embodiments, some of all of the feature subsets may be processed in parallel.

At block 515, the security system trains a threat classifier based on the selected feature subset. As discussed above, this may generally include training a classifier to receive the selected subset of features (from the labeled security logs) as input, and to generate an output indicating whether the log represents a true threat. By using the labeled logs, the weights and parameters of the threat classifier can be iteratively refined (e.g., using batch gradient descent or stochastic gradient descent) to generate more accurate inferences. In one embodiment, the training process includes generating an output classification based on an input security log (e.g., based on the relevant subset of features). This output can then be compared against the ground truth label to compute a loss (e.g., cross-entropy loss), which is back propagated through the threat classifier to refine the internal parameters (e.g., using gradient descent).

At block 520, the security system determines whether there are additional feature subsets to be processed. If so, the method 500 returns to block 510. If not, the method 500 continues to block 525.

At block 525, once all of the feature subsets have been used to train a corresponding threat classifier, the security system classifies a set of security logs using the threat classifiers. That is, the security system processes each log, in a first set of testing security logs, using each threat classifier to generate a set of classifications for the log. The security system can then annotate each security log to indicate which feature subset(s) resulted in a correct classification, which feature subset(s) generated the highest confidence value for the correct classification, and the like.

At block 530, the security system groups the security logs based on these annotations. For example, the security system may identify, for each respective feature subset, the set of security logs with annotations indicating that the respective feature subset performed the most accurately (e.g., generating a correct classification with the highest confidence). These groupings can generally indicate the potential scope of each threat classifier. For example, based on the number of logs within each group (or the diversity of logs in each group), the system may be able to infer or determine how broadly applicable each subset of features is. As discussed above, it may be beneficial to identify feature subsets that perform accurately on a broad set of security logs.

At block 535, the security system trains a type classifier based on these identified groups of security logs. As discussed above, this may generally include training a classifier to receive a set of features (e.g., all available features) from the labeled security logs as input, and to generate an output indicating which subset of features should be used to classify the potential threat. By using the labeled logs, the weights and parameters of the type classifier can be iteratively refined (e.g., using batch gradient descent or stochastic gradient descent) to generate more accurate inferences. In one embodiment, the training process includes generating an output classification based on an input security log (e.g., based on all of the available features). This output can then be compared against the ground truth label (determined based on the groupings above) to compute a loss (e.g., cross-entropy loss), which is back propagated through the type classifier to refine the internal parameters (e.g., using gradient descent).

At block 540, the security system categorizes a set of security logs using the type classifier. In some embodiments, as discussed above, the security system uses a second testing set for this categorization. At block 545, each of the testing logs in this set are then processed using the assigned threat classifier (determined by the type classifier) to generate a classification. In some embodiments, the security system classifies each log using the threat classifiers trained at block 515. In an embodiment, as discussed above, these threat classifiers were trained on a broad set of training security logs (e.g., covering the entire feature space) as at the time of training, it was not clear which particular types of threats would be accurately classified using the feature subset.

In at least one embodiment, therefore, the security system can retrain the threat classifiers using only security logs that are within the corresponding region of the feature space. In one such embodiment, the security system may use the groupings determined at block 530 to train new threat classifiers. For example, each group of security logs from the first testing set (which are grouped based on determining that they are all best classified using the same subset of features) can be used to train a new threat classifier for this feature subset. This can result in a more targeted threat classifier that is specialized for the relevant feature space represented by the logs in the corresponding group of security logs. In on embodiment, these new threat classifiers are used in block 545. The second testing set of security logs can then be processed in blocks 540 and 545 to generate the scores.

At block 550, the security system then assigns a score to each feature subset based at least in part on the classifications generated in block 545 (based on the second testing set). For example, in one embodiment, the score is directly proportional to the accuracy of the model (e.g., the percentage of security logs, which were assigned to the model by the type classifier, that were classified correctly). In at least one embodiment, the score is also directly proportional to the size of the feature space covered by the model (e.g., determined based on the number of security logs, in the second test set, that were assigned to the model).

As discussed above, these scores can be used to select the best-performing feature subsets (and to discard lowest-performing subsets), enabling the security system to iteratively identify optimized feature subsets to cover the feature space and accurately classify input security logs.

FIG. 6 is a flow diagram illustrating a method for genetic programming and machine learning to improve threat detection. In some embodiments, the method 600 is performed by a security system, such as security system 105 of FIG. 1.

At block 605, a plurality of feature subsets, each containing a respective subset of features from a plurality of features included in a set of training security logs, are identified. For example, this may correspond to block 410 or block 435 in FIG. 4.

At block 610, the plurality of feature subsets is modified using one or more genetic programming techniques. For example, this may correspond to block 415 of FIG. 4.

At block 615, each of the plurality of feature subsets is scored using a plurality of threat classifiers, wherein the plurality of threat classifiers comprise trained machine learning models. For example, this may correspond to block 425 of FIG. 4.

At block 620, a set of feature subsets is selected from the plurality of feature subsets based on the scores. For example, this may correspond to block 435 of FIG. 4.

At block 625, a type classifier is trained based on the set of feature subsets, wherein the type classifier comprises a trained machine learning model. For example, this may correspond to block 450 of FIG. 4.

Figure 7:
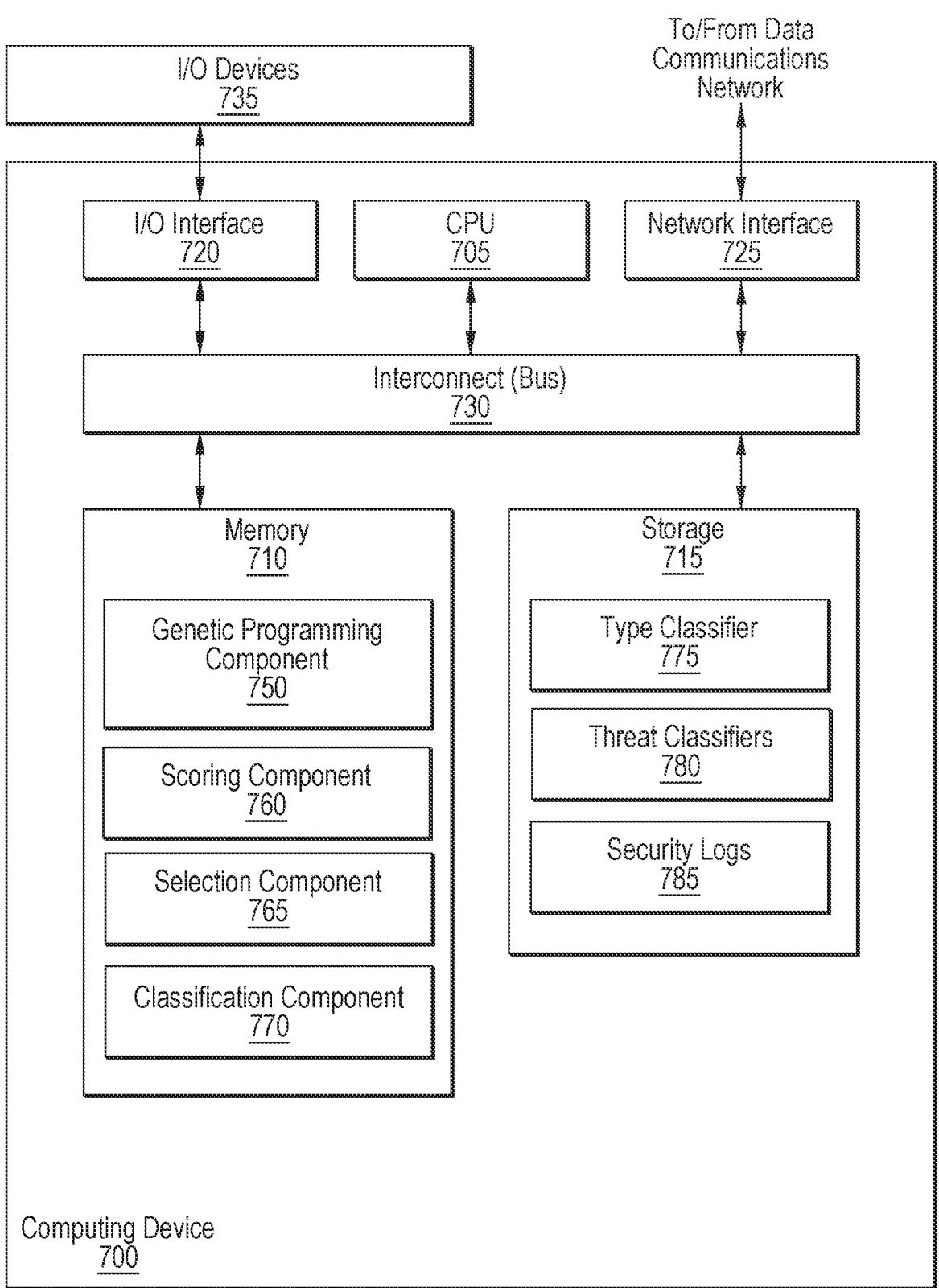
FIG. 7 is a block diagram illustrating a computing device configured to use genetic programming and machine learning to improve threat detection.

FIG. 7 is a block diagram illustrating a computing device 700 configured to use genetic programming and machine learning to improve threat detection. In some embodiments, the computing device 700 corresponds to a security system, such as security system 105 of FIG. 1.

As illustrated, the computing device 700 includes a CPU 705, memory 710, storage 715, a network interface 725, and one or more I/O interfaces 720. In the illustrated embodiment, the CPU 705 retrieves and executes programming instructions stored in memory 710, as well as stores and retrieves application data residing in storage 715. The CPU 705 is generally representative of a single CPU and/or GPU, multiple CPUs and/or GPUs, a single CPU and/or GPU having multiple processing cores, and the like. The memory 710 is generally included to be representative of a random access memory. Storage 715 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O devices 735 (such as keyboards, monitors, etc.) are connected via the I/O interface(s) 720. Further, via the network interface 725, the computing device 700 can be communicatively coupled with one or more other devices and components (e.g., via a network, which may include the Internet, local network(s), and the like). As illustrated, the CPU 705, memory 710, storage 715, network interface(s) 725, and I/O interface(s) 720 are communicatively coupled by one or more buses 730.

In the illustrated embodiment, the memory 710 includes a genetic programming component 750, a scoring component 760, a selection component 765, and a classification component 770, which may perform one or more embodiments discussed above. For example, genetic programming component 750 may be configured to apply one or more genetic programming techniques, such as crossover and mutation. In at least one embodiment, the genetic programming component 750 corresponds to crossover component 215 and/or mutation component 220 of FIG. 2.

The scoring component 760 can generally be used to score feature subsets, as discussed above. In at least one embodiment, the scoring component 760 corresponds to the scoring component 225 of FIG. 2. The selection component 765 may generally be used to select feature subsets to be retained (or discarded) during the training phase, as discussed above. In at least one embodiment, the selection component 765 corresponds to the selection component 230 of FIG. 2. The classification component 770 may generally be used to classify input security logs during runtime. For example, as discussed above, the classification component 770 may process newly-received security logs using a type classifier to identify which threat classifier (and which subset of features) should be used to classify the log. The classification component 770 may then process the security log using the identified threat classifier, in order to return a classification of the potential threat.

Although depicted as discrete components for conceptual clarity, in embodiments, the operations of the depicted components (and others not illustrated) may be combined or distributed across any number of components. Further, although depicted as software residing in memory 710, in embodiments, the operations of the depicted components (and others not illustrated) may be implemented using hardware, software, or a combination of hardware and software.

In the illustrated example, the storage 715 includes a type classifier 775, a set of threat classifiers 780, and security logs 785, each discussed above. For example, the type classifier 775 may be used to identify, for input security logs, which subset of features (and therefore, which threat classifier 780) should be used. The threat classifiers 780 may be used to classify input feature logs, based on a subset of features, as representing a true threat or a false alarm. In an embodiment, the security logs 785 may generally include historical logs labeled with appropriate classifications. These security logs 785 can be used for training the models, as well as testing and scoring the feature subsets, as discussed above. Although depicted as residing in storage 715, the illustrated data may be stored in any suitable location, including memory 710, as well as one or more remote storage locations.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the security system) or related data available in the cloud. For example, the security system could execute on a computing system in the cloud and evaluate newly-received security logs. In such a case, the security system could train and use a type classifier and a set of threat classifiers, and store these models, as well as resulting classifications, at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method, comprising:

identifying a plurality of feature subsets, each containing a respective subset of features from a plurality of features included in a set of training security logs;

modifying the plurality of feature subsets using one or more genetic programming techniques, wherein the modifying includes at least one selected from the group consisting of: (i) selecting a first feature subset from the plurality of feature subsets at least partially randomly, selecting a first feature included in the first feature subset at least partially randomly, selecting a second feature not included in the first feature subset at least partially randomly, and mutating the first feature subset by replacing the first feature with the second feature, and (ii) selecting a first feature subset from the plurality of feature subsets at least partially randomly, selecting a second feature subset from the plurality of feature subsets at least partially randomly, and mating the first and second feature subsets to generate two additional feature subsets to include in the plurality of feature subsets, comprising swapping at least a portion of the first feature subset with at least a portion of the second feature subset;

scoring each of the plurality of feature subsets using a first plurality of threat classifiers, wherein the plurality of threat classifiers correspond to trained machine learning models, comprising:

generating, for each respective training security log of the set of training security logs, a respective plurality of classifications based on processing the respective training security log using each of the first plurality of threat classifiers; and generating a plurality of security log groups based on the respective pluralities of classifications, wherein each respective security log group of the plurality of security log groups corresponds to a respective type of threat;

training a second plurality of threat classifiers based on the scores and the plurality of security log groups, the second plurality of threat classifiers comprising a respective threat classifier for each respective security log group of the plurality of security log groups; and training a type classifier, based on the plurality of security log groups, to route security logs among the second plurality of threat classifiers based on the types of threat.

2. The method of claim 1, wherein scoring each of the plurality of feature subsets comprises:

training a respective threat classifier, of the plurality of threat classifiers, based on each respective security log group of the plurality of security log groups, wherein each respective threat classifier learns to determine whether input security logs represent a true threat;

classifying at least a subset of the set of training security logs using the plurality of threat classifiers; and labeling the subset of the set of training security logs to indicate which feature subset, of the plurality of feature subsets, resulted in a highest prediction accuracy.

3. The method of claim 2, wherein a respective score of each respective feature subset of the plurality of feature subsets is determined based at least in part on:

an accuracy of the respective threat classifier trained based on the respective feature subset; and a number of the set of training security logs that the respective threat classifier accurately classifies.

4. The method of claim 1, further comprising:

receiving a new security log including the plurality of features; and selecting a first feature subset of the set of feature subsets by processing the new security log using the type classifier.

5. The method of claim 4, further comprising:

identifying a first threat classifier trained based on the first feature subset; and classifying the new security log using the first threat classifier.

6. The method of claim 1, wherein identifying a plurality of feature subsets comprises, for each respective feature subset of the plurality of feature subsets, selecting features from the plurality of features at least partially randomly.

7. A system, comprising:

one or more computer processors; and logic encoded in a storage medium, the logic executable by operation of the one or more computer processors to perform an operation comprising:

identifying a plurality of feature subsets, each containing a respective subset of features from a plurality of features included in a set of training security logs;

modifying the plurality of feature subsets using one or more genetic programming techniques, wherein the modifying includes at least one selected from the group consisting of: (i) selecting a first feature subset from the plurality of feature subsets at least partially randomly, selecting a first feature included in the first feature subset at least partially randomly, selecting a second feature not included in the first feature subset at least partially randomly, and mutating the first feature subset by replacing the first feature with the second feature, and (ii) selecting a first feature subset from the plurality of feature subsets at least partially randomly, selecting a second feature subset from the plurality of feature subsets at least partially randomly, and mating the first and second feature subsets to generate two additional feature subsets to include in the plurality of feature subsets, comprising swapping at least a portion of the first feature subset with at least a portion of the second feature subset;

scoring each of the plurality of feature subsets using a first plurality of threat classifiers, wherein the plurality of threat classifiers correspond to trained machine learning models, comprising:

generating, for each respective training security log of the set of training security logs, a respective plurality of classifications based on processing the respective training security log using each of the first plurality of threat classifiers; and generating a plurality of security log groups based on the respective pluralities of classifications, wherein each respective security log group of the plurality of security log groups corresponds to a respective type of threat;

training a second plurality of threat classifiers based on the scores and the plurality of security log groups, the second plurality of threat classifiers comprising a respective threat classifier for each respective security log group of the plurality of security log groups; and training a type classifier, based on the plurality of security log groups, to route security logs among the second plurality of threat classifiers based on the types of threat.

8. The system of claim 7, wherein scoring each of the plurality of feature subsets comprises:

training a respective threat classifier, of the plurality of threat classifiers, based on each respective security log group of the plurality of security log groups, wherein each respective threat classifier learns to determine whether input security logs represent a true threat;

classifying at least a subset of the set of training security logs using the plurality of threat classifiers; and labeling the subset of the set of training security logs to indicate which feature subset, of the plurality of feature subsets, resulted in a highest prediction accuracy.

9. The system of claim 8, wherein a respective score of each respective feature subset of the plurality of feature subsets is determined based at least in part on:

an accuracy of the respective threat classifier trained based on the respective feature subset; and a number of the set of training security logs that the respective threat classifier accurately classifies.

10. The system of claim 7, wherein the logic is further executable by operation of the one or more computer processors to perform:

receiving a new security log including the plurality of features;

selecting a first feature subset of the set of feature subsets by processing the new security log using the type classifier; and identifying a first threat classifier trained based on the first feature subset; and classifying the new security log using the first threat classifier.

11. A computer product comprising logic encoded in a non-transitory medium, the logic executable by operation of one or more computer processors to perform an operation comprising:

identifying a plurality of feature subsets, each containing a respective subset of features from a plurality of features included in a set of training security logs;

modifying the plurality of feature subsets using one or more genetic programming techniques, wherein the modifying includes at least one selected from the group consisting of: (i) selecting a first feature subset from the plurality of feature subsets at least partially randomly, selecting a first feature included in the first feature subset at least partially randomly, selecting a second feature not included in the first feature subset at least partially randomly, and mutating the first feature subset by replacing the first feature with the second feature, and (ii) selecting a first feature subset from the plurality of feature subsets at least partially randomly, selecting a second feature subset from the plurality of feature subsets at least partially randomly, and mating the first and second feature subsets to generate two additional feature subsets to include in the plurality of feature subsets, comprising swapping at least a portion of the first feature subset with at least a portion of the second feature subset;

scoring each of the plurality of feature subsets using a first plurality of threat classifiers, wherein the plurality of threat classifiers correspond to trained machine learning models, comprising:

generating, for each respective training security log of the set of training security logs, a respective plurality of classifications based on processing the respective training security log using each of the first plurality of threat classifiers; and generating a plurality of security log groups based on the respective pluralities of classifications, wherein each respective security log group of the plurality of security log groups corresponds to a respective type of threat;

training a second plurality of threat classifiers based on the scores and the plurality of security log groups, the second plurality of threat classifiers comprising a respective threat classifier for each respective security log group of the plurality of security log groups; and training a type classifier, based on the plurality of security log groups, to route security logs among the second plurality of threat classifiers based on the types of threat.

12. The computer product of claim 11, wherein scoring each of the plurality of feature subsets comprises:

training a respective threat classifier, of the plurality of threat classifiers, based on each respective security log group of the plurality of security log groups, wherein each respective threat classifier learns to determine whether input security logs represent a true threat;

classifying at least a subset of the set of training security logs using the plurality of threat classifiers; and labeling the subset of the set of training security logs to indicate which feature subset, of the plurality of feature subsets, resulted in a highest prediction accuracy.

13. The computer product of claim 12, wherein a respective score of each respective feature subset of the plurality of feature subsets is determined based at least in part on:

an accuracy of the respective threat classifier trained based on the respective feature subset; and a number of the set of training security logs that the respective threat classifier accurately classifies.

14. The computer product of claim 11, wherein the logic is further executable by operation of the one or more computer processors to perform:

receiving a new security log including the plurality of features;

selecting a first feature subset of the set of feature subsets by processing the new security log using the type classifier; and identifying a first threat classifier trained based on the first feature subset; and classifying the new security log using the first threat classifier.

\* \* \* \* \*